(12) United States Patent
Smith

(10) Patent No.: US 7,678,341 B2
(45) Date of Patent: Mar. 16, 2010

(54) LOOP REACTOR HEAT REMOVAL

(75) Inventor: Lawrence C. Smith, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 657 days.

(21) Appl. No.: 11/193,957

(22) Filed: Jul. 29, 2005

(65) Prior Publication Data

US 2007/0022768 A1 Feb. 1, 2007

(51) Int. Cl.
  *B01J 19/00* (2006.01)
  *F25B 29/00* (2006.01)
  *F25D 17/02* (2006.01)
  *C08F 2/00* (2006.01)

(52) U.S. Cl. ............... 422/138; 422/131; 422/132; 165/65; 62/201; 526/64

(58) Field of Classification Search ............ 422/131, 422/132, 138; 165/65; 62/201; 526/64
See application file for complete search history.

(56) References Cited

U.S. PATENT DOCUMENTS

| | | | | |
|---|---|---|---|---|
| 2,788,264 A | * | 4/1957 | Bremer et al. | 422/109 |
| 4,668,473 A | * | 5/1987 | Agarwal | 422/62 |
| 4,744,408 A | | 5/1988 | Pearson et al. | 165/2 |
| 5,565,175 A | | 10/1996 | Hottovy et al. | 422/132 |
| 5,597,881 A | | 1/1997 | Winter et al. | 526/348 |
| 6,235,852 B1 | | 5/2001 | Hess et al. | 526/65 |
| 6,455,643 B1 | | 9/2002 | Harlin et al. | 526/65 |
| 6,562,914 B1 | | 5/2003 | Andtsjo et al. | 526/64 |
| 2003/0114608 A1 | | 6/2003 | Tharappel et al. | 526/64 |
| 2005/0095176 A1 | | 5/2005 | Hottovy | 422/131 |
| 2006/0045823 A1 | * | 3/2006 | Shaw et al. | 422/139 |

FOREIGN PATENT DOCUMENTS

| | | |
|---|---|---|
| EP | 0516037 | 2/1992 |
| EP | 0526741 | 10/1993 |
| FR | 1503642 | 12/1967 |

\* cited by examiner

*Primary Examiner*—Walter D Griffin
*Assistant Examiner*—Lessanework Seifu
(74) *Attorney, Agent, or Firm*—Jennifer Schmidt; Kevin M. Faulkner

(57) ABSTRACT

The present invention provides a process for cooling a polymerization reactor having at least four leg jackets. In the four leg jacket embodiment, the process comprises pumping a first coolant through a first pair of leg jackets, and pumping a second coolant through a different pair of leg jackets. In this process, the first coolant does not contact the second coolant while inside the leg jackets.

16 Claims, 3 Drawing Sheets

LOOP REACTOR HEAT REMOVAL

TECHNICAL FIELD OF THE INVENTION

The present invention relates, generally, to the field of increasing reactor heat removal, more particularly, to a process for circulating cooling fluid through an external jacket to remove heat from a loop reactor.

BACKGROUND OF THE INVENTION

The invention relates to a process for cooling polymerization-loop-slurry reactors in the preparation of polyolefins. Generally speaking, polymerization-loop-slurry reactors are used to house the circulation of a slurry comprising olefin, catalyst, polyolefin, and diluents. Loop-slurry reactors have a series of straight pipes connected by appropriate bent pipes, which form a continuous loop. Most loop-slurry reactors have four, six, or eight straight pipes segments, which are called legs. The loop-slurry reactor used according to the present invention may be any loop reactor known in the art to be used for slurry polymerizations. An example of such a loop-slurry reactor is described in U.S. Pat. No. 5,565,175, which is incorporated by reference in full.

The conversion of olefins to polyolefins in these reactors is an exothermic process. Accordingly, the heat of the reaction must be removed so that the temperature of the slurry in the loop-slurry reactor can be controlled. Each leg is surrounded by a jacket. The leg jacket is defined as an external jacket, sleeve, or pipe, through which a cooling fluid flows and absorbs heat emitted from the leg. In an embodiment the leg jacket is a second pipe that is concentric to and surrounding the reactor pipe. A cooling fluid, (typically water) that is at a lower temperature than the reactor contents, flows through the leg jacket and heat is transferred from the reactor contents to the cooling fluid. Suitable leg jackets may be obtained from Fabricom Company located in Belgium.

In a Conventional Process—described more fully below with reference to FIG. 1—a first cooling liquid, typically water, is pumped sequentially through each external jacket to absorb the heat of reaction and control the reactor temperature. As the first cooling liquid flows through each of the external jackets, heat is transferred from the reactor to the cooling liquid, and the temperature of the cooling liquid increases. The first cooling liquid is passed through a heat exchanger where the absorbed heat of the first cooling liquid is transferred to an external cooling liquid, typically water. The external cooling liquid is either discarded or preferably recycled into some other process. The external cooling liquid is preferably derived from a large source of readily available water such as a cooling tower or sea water. Accordingly, in some embodiments the temperature of the external cooling liquid is dependent upon the temperature of the environment. The first cooling liquid is re-circulated through the external jackets and the heat exchanger with the use of a pump.

In recent years, advances in catalysis and other process conditions have allowed for increased polymer production rates, which correspondingly increase the heat of reaction. Accordingly, there is a need to remove this increased amount of heat in order to maintain or improve productivity. One method for increasing the heat removal capability of the above-described Conventional Process is to reduce the temperature of the first cooling liquid that enters the external jackets. However, this method is limited, in practice, to the extent that the temperature of the cooling liquid cannot be reduced lower than the temperature of the external cooling liquid. And the temperature of the external cooling liquid is fixed because it is preferably dependent on the environment.

A second method for increasing the heat removal capability of the above-described Conventional Process is to increase the recirculation rate of the first cooling liquid. In an embodiment, between about 7 to about 10 percent more heat can be removed when the recirculation rate is doubled. Increasing the recirculation rate of the first cooling liquid requires either increasing the velocity of the cooling liquid in the space between the jackets and the reactor legs or increasing the size of the external jackets and the interconnecting pipes. However, because pressure drop is proportional to the square of velocity, doubling the velocity of the first cooling liquid will cause the pressure drop across the pump to increase by at least twice. Additionally, increasing the velocity of the first cooling liquid could cause long term erosion of the reactor nozzles and jackets. With respect to the possibility of redesigning the external jackets, this option is timely and expensive and is not practical for application to existing reactors.

U.S. Pat. No. 6,235,852 ("Hess") discloses a process for cooling polymerization reactors in the preparation of polyolefins, the polymerization being carried out in a first reactor and in at least one further reactor, the further reactor or reactors being connected downstream of the first reactor and each being cooled by an internal cooling circuit in which a cooling medium circulates.

Accordingly, there is a need for a process that can increase the amount of heat removed from a single polymerization reactor, as well as a reactor system, while minimizing the increase in pressure drop, does not require extensive modifications, and will not erode the systems conduits or external jackets.

SUMMARY OF THE INVENTION

In an embodiment, the present invention provides a process for cooling a polymerization reactor having four leg jackets. The process comprises pumping a first coolant through a first pair of leg jackets, and pumping a second coolant through a different pair of leg jackets. In this process, the first coolant does not contact the second coolant while inside the leg jackets.

In any embodiment herein, the first coolant and the second coolant are water. In any embodiment herein, the process further comprising: pumping the first coolant from a first pump into a first leg jacket; pumping the first coolant from the first leg jacket into a second leg jacket; pumping the first coolant from the second leg jacket into a first heat exchanger; pumping the first coolant from the first heat exchanger into the first pump; pumping the second coolant from a second pump into a fourth leg jacket; pumping the second coolant from the fourth leg jacket into a third leg jacket; pumping the second coolant from the third leg jacket into a second heat exchanger; and pumping the second coolant from the second heat exchanger into the second pump. In any embodiment herein, the first pump and the second pump are the same pump. In any embodiment herein, the first heat exchanger and the second heat exchanger are the same heat exchanger. In any embodiment herein, the first coolant and the second coolant are the same. In any embodiment herein, the coolant is water. In any embodiment herein, the polymerization reactor is a polypropylene slurry reactor. In any embodiment herein, the polymerization reactor is a polyethylene slurry reactor.

In another embodiment, the present invention also provides a process for cooling a polymerization reactor having six leg jackets. This process comprises pumping a first coolant through a first pair of leg jackets; pumping a second coolant through a second pair of leg jackets; and pumping a third coolant through a third pair of leg jackets. Moreover, the first pair of leg jackets, the second pair of leg jackets, and the third pair of leg jackets are different legs from each other, and the first coolant, the second coolant and the third coolant do not contact each other while inside the leg jackets.

In any embodiment herein, the first coolant, the second coolant, and the third coolant are water. In any embodiment herein, the process further comprises: pumping the first coolant from a first pump into a first leg jacket; pumping the first coolant from the first leg jacket into a second leg jacket; pumping the first coolant from the second leg jacket into a first heat exchanger; pumping the first coolant from the first heat exchanger into the first pump; pumping the second coolant from a second pump into a third leg jacket; pumping the second coolant from the third leg jacket into a fourth leg jacket; pumping the second coolant from the fourth leg jacket into a second heat exchanger; pumping the second coolant from the second heat exchanger into the second pump; pumping the third coolant from a third pump into a fifth leg jacket; pumping the third coolant from the fifth leg jacket into a sixth leg jacket; pumping the third coolant from the sixth leg jacket into a third heat exchanger; and pumping the third coolant from the second heat exchanger into the third pump. In any embodiment herein, the first pump, the second pump, and the third pump are the same pump. In any embodiment herein, the first heat exchanger, the second heat exchanger, and the third heat exchanger are the same heat exchanger. In any embodiment herein, the first coolant, the second coolant and the third coolant are the same.

In an embodiment the present invention provides a process for cooling a polymerization reactor having six leg jackets comprising: pumping a first coolant through a first pair of leg jackets; pumping a second coolant through a set of four leg jackets; wherein the first pair of leg jackets is different from the set of four leg jackets, and wherein the first coolant and the second coolant do not contact each other while inside the leg jackets.

In an embodiment, the invention further provides a process for cooling a polymerization reactor having eight leg jackets. This process comprises pumping a first coolant through a first pair of leg jackets; pumping a second coolant through a second pair of leg jackets; pumping a third coolant through a third pair of leg jackets; and pumping a fourth coolant through a fourth pair of leg jackets. The first pair of leg jackets, the second pair of leg jackets, the third pair of leg jackets and the fourth pair of leg jackets are different legs from each other. And the first coolant, the second coolant, the third coolant, and the fourth coolant do not contact each other while inside the leg jackets. In any embodiment herein, the first coolant, the second coolant, the third coolant, and the fourth coolant are water.

In another embodiment, this invention provides a process for cooling a polymerization reactor having eight leg jackets. In this embodiment the process comprises pumping a first coolant through a first set of four leg jackets; and pumping a second coolant through a second set of leg jackets. The first set of four leg jackets are different from the second set of four leg jackets, and the first coolant and the second coolant do not contact each other while inside the leg jackets.

In an embodiment, the present invention provides a process for cooling a polymerization reactor having eight leg jackets comprising: pumping a first coolant through a first pair of leg jackets; pumping a second coolant through a second pair of leg jackets; pumping a third coolant through a set of four leg jackets; wherein the first pair of leg jackets, the second pair of leg jackets, and the set of four leg jackets are different legs from each other, and wherein the first coolant, the second coolant and the third coolant do not contact each other while inside the leg jackets.

In an embodiment the present invention provides that in a method of cooling a polymerization reactor of the type having four leg jackets, wherein a cooling fluid is pumped in sequence from a first leg jacket to a second leg jacket to a third leg jacket to a fourth leg jacket; a heat exchanger cools the cooling fluid existing the fourth leg jacket, and the cooling fluid is pumped into the first leg jacket, the improvement comprising: preventing at least a portion of the first cooling fluid from entering a first pair of leg jackets; introducing a second cooling fluid into the first pair of leg jackets; and withdrawing the first cooling fluid from a second pair of leg jackets, wherein the first cooling fluid and the second cooling fluid do not contact each other while inside the leg jackets. In any embodiment herein, the improvement further comprising: increasing the flow rate of the first cooling fluid and the second cooling fluid; replacing the pump with a larger pump sufficient to increase the flow rate of the first cooling fluid and the second cooling fluid; and replacing the heat exchanger with a larger heat exchanger sufficient to remove at least the same amount of heat removed by the heat exchanger. In any embodiment herein, the first cooling fluid and the second cooling fluid are the same.

Other features and advantages of the present invention will be apparent to those of ordinary skill in the art upon reference to the following detailed description taken in conjunction with the accompanying drawings.

BRIEF DESCRIPTION OF THE DRAWINGS

For a better understanding of the invention, and to show by way of example how the same may be carried into effect, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not limit the scope of the invention.

Figure 1:
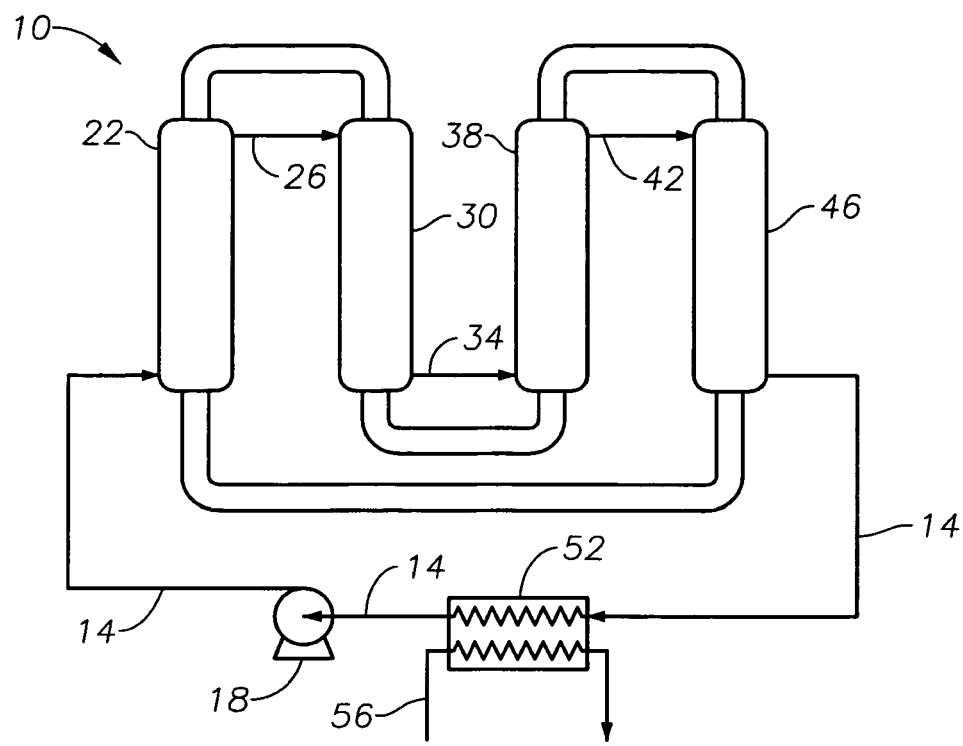
FIG. 1 illustrates a Conventional Process for cooling a polymerization reactor.

With reference to FIG. 1, a Conventional Process 10 is shown. A first conduit 14 houses a first cooling liquid. The first cooling liquid is recirculated through the Conventional Process using a pump 18. The first cooling liquid is pumped from the pump 18 into the bottom of a first external jacket 22. While inside the first external jacket 22 the cooling liquid absorbs the heat from the reactor and passes from the bottom of the first external jacket 22 to the top of the first external jacket 22. The first cooling liquid is pumped from the top of the first external jacket 22 through a second conduit 26 and into the top of a second external jacket 30. While inside the second external jacket 30 the cooling liquid absorbs the heat from the reactor and passes from the top of the second external jacket 30 to the bottom of the second external jacket 30. From the bottom of the second external jacket 30 the cooling liquid is pumped through a third conduit 34 and into the bottom of a third external jacket 38. While inside the third external jacket 38 the cooling liquid absorbs the heat from the reactor and passes from the bottom of the third external jacket 38 to the top of the third external jacket 38. The first cooling liquid is pumped from the top of the third external jacket 38 through a fourth conduit 42 into the top of a fourth external jacket 46. While inside the fourth external jacket 46 the cooling liquid absorbs the heat from the reactor and passes from the top of the fourth external jacket 46 to the bottom of the fourth external jacket 46. From the bottom of the fourth external jacket 46 the cooling liquid is pumped into a heat exchanger 52. The heat exchanger 52 transfers the heat from the first cooling liquid into the external cooling liquid. In this manner, the first conduit 14 flows hot cooling liquid into the heat exchanger 52, and cold cooling liquid out of the heat exchanger 52. Accordingly, the external loop conduit 56 flows cold external cooling liquid into the heat exchanger 52 and hot external cooling liquid out of the heat exchanger 52.

Figure 2:
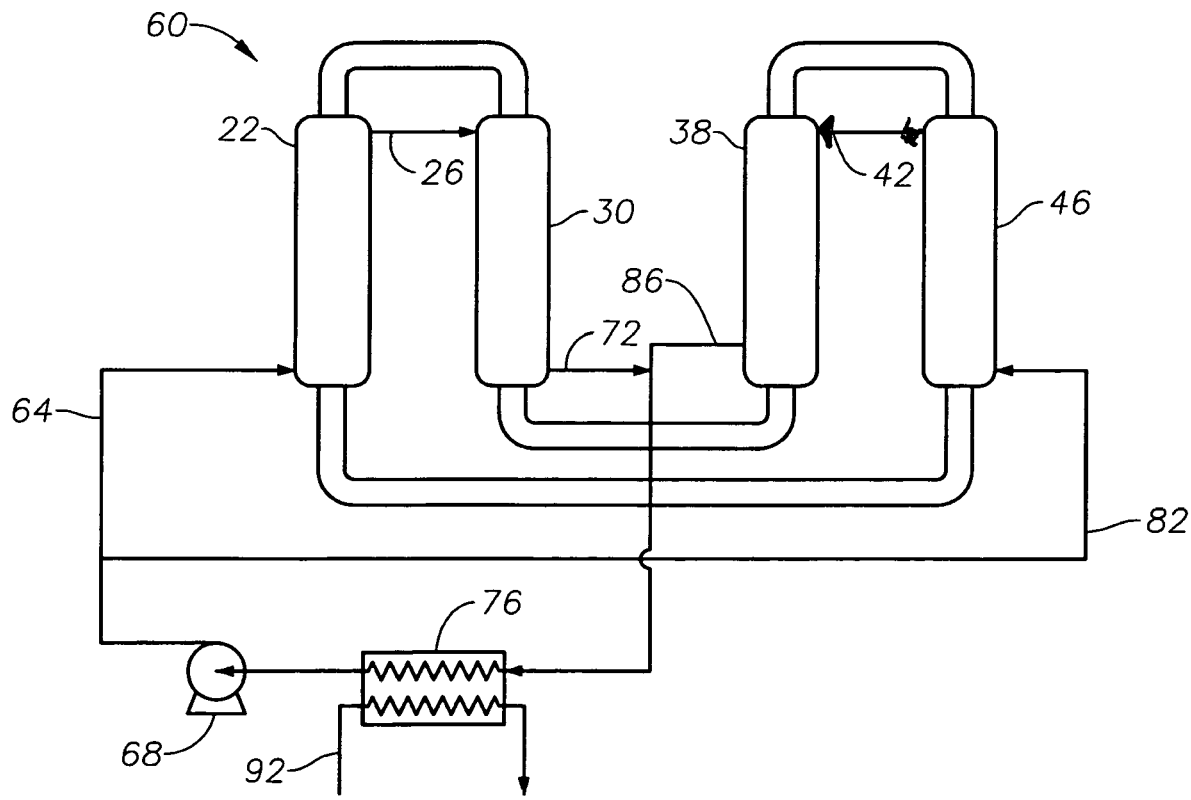
FIG. 2 illustrates a process for cooling a polymerization reactor in accordance with one embodiment of the present invention.

With reference to FIG. 2, a Four Leg Process 60, of the present invention is shown. The first cooling liquid is pumped via a second pump 68. In an embodiment, the second pump has twice the flow capacity of the pump 18 in FIG. 1. In another embodiment, two pumps identical to pump 18 in FIG. 1 can operate in parallel. In an embodiment, the required pump differential pressure is the same or lower than pump 18 in FIG. 1. The flow from the second pump 68 flows via a fifth conduit 64 and a sixth conduit 82 toward the first external jacket 22 and the fourth external jacket 46, respectively. While inside the first external jacket 22 the cooling liquid absorbs the heat from the reactor and passes from the bottom of the first external jacket 22 to the top of the first external jacket 22. The first cooling liquid flows from the top of the first external jacket 22 through the second conduit 26 and into the top of the second external jacket 30. While inside the second external jacket 30 the cooling liquid absorbs the heat from the reactor and passes from the top of the second external jacket 30 to the bottom of the second external jacket 30. From the bottom of the second external jacket 30 the cooling liquid is pumped through a seventh conduit 72.

The first cooling liquid from the sixth conduit 82 is pumped from the pump 68 into bottom of the fourth external jacket 46. While inside the fourth external jacket 46 the cooling liquid absorbs the heat from the reactor and passes from the bottom of the fourth external jacket 46 to the top of the fourth external jacket 46. The first cooling liquid is pumped from the top of the fourth external jacket 46 through the fourth conduit 42 into the top of the third external jacket 38. While inside the third external jacket 38 the cooling liquid absorbs the heat from the reactor and passes from the top of the third external jacket 38 to the bottom of the third external jacket 38. From the bottom of the third external jacket 38 the cooling liquid is pumped through an eight conduit 86. In an embodiment, the cooling liquids in the eight conduit 86 and the seventh conduit 72 mix together and are routed to a second heat exchanger 76. In another embodiment, the cooling liquid in eight conduit 86 and the cooling liquid in seventh conduit 72 are routed to separate exchangers (not shown). The second heat exchanger 76 transfers the heat from the first cooling liquid into the external cooling liquid. Accordingly, a second external loop conduit 92 flows cold external cooling liquid into the second heat exchanger 76 and hot external cooling liquid out of the second heat exchanger 76. The cooled first cooling liquid is re-circulated via the pump 68.

Having the benefit of FIG. 2, one skilled in the art would recognize other embodiments of a process for cooling a polymerization reactor having four leg jackets 22, 30, 38, and 46. Specifically, a first coolant may be pumped through any first pair of leg jackets; and a second coolant may be pumped through any second pair of leg jackets, wherein the first pair of leg jackets is different from the second pair of leg jackets and wherein the first coolant does not contact the second coolant while inside the leg jackets.

Figure 3:
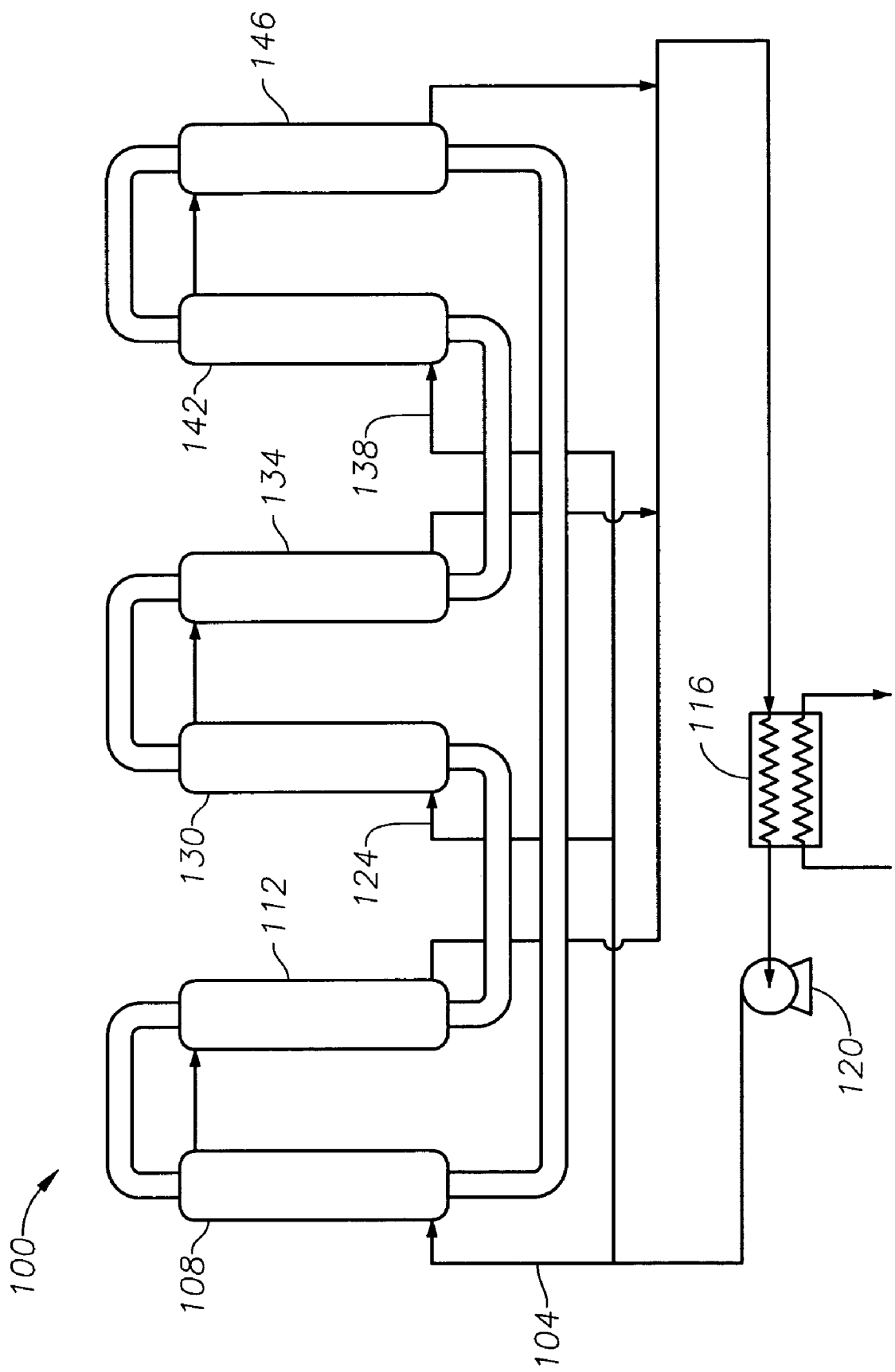
FIG. 3 illustrates a process for cooling a polymerization reactor in accordance with a second embodiment of the present invention.

With reference to FIG. 3, a Six Leg Process 100, of the present invention is shown. A ninth conduit 104 houses at least a portion of a first cooling liquid. The first cooling liquid is re-circulated through a fifth external jacket 108, a sixth external jacket 112, a third heat exchanger 116, a third pump 120 in a manner similar to the recirculation of the first cooling liquid through the first external jacket 22, the second external jacket 30, the second heat exchanger 76 and the second pump 68 of the Fourth Leg Process 60.

A tenth conduit 124 houses at least a portion of a first cooling liquid. The first cooling liquid is re-circulated through a seventh external jacket 130, an eighth external jacket 134, a third heat exchanger 116, a third pump 120 in a manner similar to the recirculation of the first cooling liquid through the first external jacket 22, the second external jacket 30, the second heat exchanger 76 and the second pump 68 of the Fourth Leg Process 60. In another embodiment a second cooling liquid is re-circulated through the seventh external jacket 130, the eighth external jacket 134, a fourth heat exchanger (not shown), and a fourth pump (not shown).

An eleventh conduit 138 houses at least a portion of a first cooling liquid. The first cooling liquid is re-circulated through a ninth external jacket 142, an tenth external jacket 146, a third heat exchanger 116, a third pump 120 in a manner similar to the recirculation of the first cooling liquid through the first external jacket 22, the second external jacket 30, the second heat exchanger 76 and the second pump 68 of the Fourth Leg Process 60. In another embodiment a third cooling liquid is re-circulated through the ninth external jacket 142, the tenth external jacket 146, a fifth heat exchanger (not shown), and a sixth pump (not shown).

In an embodiment, the third pump 120 has three times the flow capacity of the pump 18 in FIG. 1. In another embodiment, the third pump 120, the fourth pump (not shown), and the fifth pump (not shown) have the same capacity as the pump 18 in FIG. 1. In an embodiment, the third heat exchanger 116 has three times the heat removal capacity of the heat exchanger 52 in FIG. 1. In another embodiment, the third heat exchanger 116, the fourth heat exchanger (not shown), and the fifth heat exchanger (not shown) have the same capacity as the heat exchanger 52 in FIG. 1.

Having the benefit of FIG. 3, one skilled in the art would recognize other embodiments of a process for cooling a polymerization reactor having six leg jackets 108, 112, 130, 134, 142, and 146. Specifically, a first coolant may be pumped through any first pair of leg jackets; a second coolant may be pumped through any second pair of leg jackets; and a third coolant may be pumped through any third pair of leg jackets, wherein the first pair of leg jackets, the second pair of leg jackets, and the third pair of leg jackets are different legs from each other, and wherein the first coolant, the second coolant and the third coolant do not contact each other while inside the leg jackets.

Figure 4:
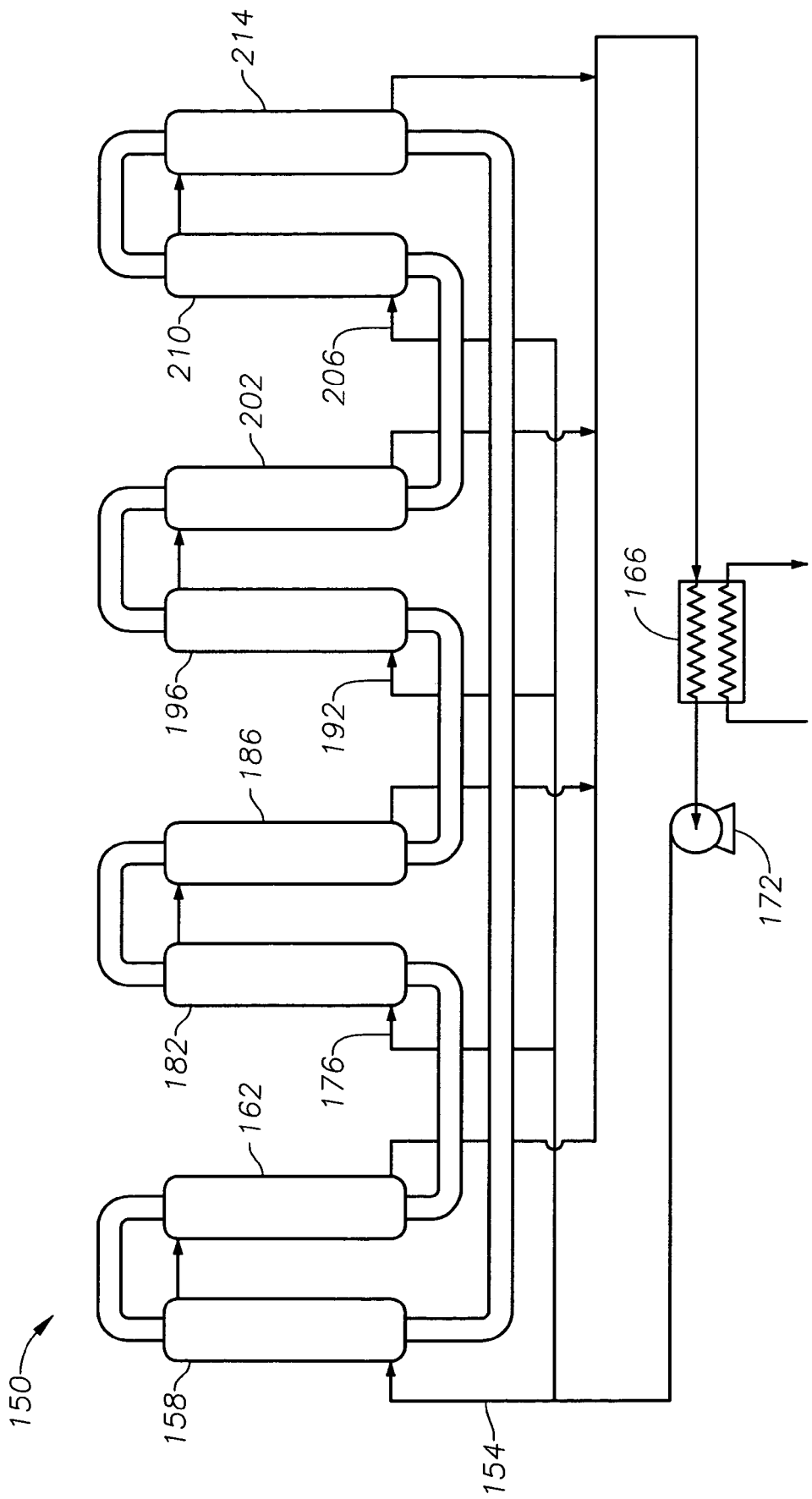
FIG. 4 illustrates a process for cooling a polymerization reactor in accordance with a third embodiment of the present invention.

With reference to FIG. 4, an Eight Leg Process 150, of the present invention is shown. A twelfth conduit 154 houses at least a portion of a first cooling liquid. The first cooling liquid is re-circulated through an eleventh external jacket 158, a twelfth external jacket 162, a sixth heat exchanger 166, a sixth pump 172 in a manner similar to the recirculation of the first cooling liquid through the first external jacket 22, the second external jacket 30, the second heat exchanger 76 and the second pump 68 of the Fourth Leg Process 60.

A thirteenth conduit 176 houses at least a portion of a first cooling liquid. The first cooling liquid is re-circulated through a thirteenth external jacket 182, a fourteenth external jacket 186, a sixth heat exchanger 166, a sixth pump 172 in a manner similar to the recirculation of the first cooling liquid through the first external jacket 22, the second external jacket 30, the second heat exchanger 76 and the second pump 68 of the Fourth Leg Process 60. In another embodiment a second cooling liquid is re-circulated through the thirteenth external jacket 182, the fourteenth external jacket 186, a seventh heat exchanger (not shown), and a seventh pump (not shown).

A fourteenth conduit 192 houses at least a portion of a first cooling liquid. The first cooling liquid is re-circulated through a fifteenth external jacket 196, a sixteenth external jacket 202, a sixth heat exchanger 166, a sixth pump 172 in a manner similar to the recirculation of the first cooling liquid through the first external jacket 22, the second external jacket 30, the second heat exchanger 76 and the second pump 68 of the Fourth Leg Process 60. In another embodiment a third cooling liquid is re-circulated through the fifteenth external jacket 196, the sixteenth external jacket 202 is pumped into an eighth heat exchanger (not shown), and an eighth pump (not shown).

A fifteenth conduit 206 houses at least a portion of a first cooling liquid. The first cooling liquid is re-circulated through a seventeenth external jacket 210, an eighteenth external jacket 214, a sixth heat exchanger 166, a sixth pump 172 in a manner similar to the recirculation of the first cooling liquid through the first external jacket 22, the second external jacket 30, the second heat exchanger 76 and the second pump 68 of the Fourth Leg Process 60. In another embodiment a fourth cooling liquid is re-circulated through the seventeenth external jacket 210, the eighteenth external jacket 214, a ninth heat exchanger (not shown), and a ninth pump (not shown).

In an embodiment, the sixth pump 172 has four times the flow capacity of the pump 18 in FIG. 1. In another embodiment, the sixth pump 172, the seventh pump (not shown), the eighth pump (not shown), and the ninth pump (not shown) have the same capacity as the pump 18 in FIG. 1. In an embodiment, the sixth heat exchanger 166 has four times the heat removal capacity of the heat exchanger 52 in FIG. 1. In another embodiment, the sixth heat exchanger 166, the seventh heat exchanger (not shown), the eighth heat exchanger (not shown), and the ninth heat exchanger (not shown) have the same capacity as the heat exchanger 52 in FIG. 1.

Having the benefit of FIG. 4, one skilled in the art would recognize other embodiments of a process for cooling a polymerization reactor having eight leg jackets 158, 162, 182, 186, 196, 202, 210, and 214. In an embodiment, a first coolant may be pumped through any first pair of leg jackets; a second coolant may be pumped through any second pair of leg jackets; a third coolant may be pumped through any third pair of leg jackets; a fourth coolant may be pumped through any fourth pair of leg jackets; wherein the first pair of leg jackets, the second pair of leg jackets, the third pair of leg jackets and the fourth pair of leg jackets are different legs from each other, and wherein the first coolant, the second coolant, the third coolant, and the fourth coolant do not contact each other while inside the leg jackets. In another embodiment, a first coolant may be pumped through any first set of four leg jackets; and a second coolant may be pumped through any second set of four leg jackets; wherein the first set of four leg jackets are different from the second set of four leg jackets, and wherein the first coolant and the second coolant do not contact each other while inside the leg jackets.

In Table 1 three process systems were calculated using basic heat transfer assumptions. The first calculated process was a Conventional System as described above with reference to FIG. 1, and having a certain water rate of X kTons per hour. The second calculated process was a Conventional System as described above with reference to FIG. 1, and having a water rate of 2X kTons per hour. The third calculated process was an inventive system as described above with reference to FIG. 2, and having a water rate of 2X kTons per hour. All other pertinent process variables such as reactor temperature, amount of heat transfer area, cooled water temperature, etc were kept constant.

TABLE 1

|  | First Calculated Process | Second Calculated Process | Third Calculated Process |
|---|---|---|---|
| Water Flow Path | Conventional | Conventional | Inventive |
| Water Rate (kTons/hr) | X | 2 times X | 2 Flows at X each |
| Water Inlet Temperature (° C.) | 41 | 41 | 41 |
| Heater Removed (MegaWatts) | Y | $1.08 \times Y$ | $1.08 \times Y$ |
| Increased Heat Removal Over Base Case | Not Applicable | 8% | 8% |
| Water Pump Delta Pressure (bar) | Z | 2 times Z | Z |

The embodiments and table set forth herein are presented to best explain the present invention and its practical application and to thereby enable those skilled in the art to make and utilize the invention. However, those skilled in the art will recognize that the foregoing descriptions and table have been presented for the purpose of illustration and example only. The description as set forth is not intended to be exhaustive or to limit the invention to the precise form disclosed. Many modifications and variations are possible in light of the above teaching without departing from the spirit and scope of the following claims.

The invention claimed is:

1. A process for cooling a polypropylene polymerization reactor having four leg jackets comprising:
   a. pumping a first coolant through a first pair of leg jackets comprising a first leg jacket and a second leg jacket using a first pump; and
   b. pumping a second coolant through a different pair of leg jackets comprising a third leg jacket and a fourth leg jacket using a second pump, wherein the first pump and the second pump operate in parallel and,
      wherein the first coolant does not contact the second coolant while inside the leg jackets,
      wherein step a. comprises:
      i. pumping the first coolant from the first pump into the first leg jacket;
      ii. pumping the first coolant from the first leg jacket into the second leg jacket;
      iii. pumping the first coolant from the second leg jacket into a first heat exchanger, wherein the first heat exchanger comprises a first external loop conduit circulating a first cold external liquid and the first heat exchanger transfers heat from the first coolant to the first cold external cooling liquid; and iv. the first coolant is recirculated via the first pump; and
wherein step b. comprises:
i. pumping the second coolant from the second pump into the third leg jacket;
ii. pumping the second coolant from the third leg jacket into the fourth leg jacket;
iii. pumping the second coolant from the fourth leg jacket into a second heat exchanger, wherein the second heat exchanger comprises a second external loop conduit circulating a second cold external liquid and the second heat exchanger transfers heat from the second coolant to the second cold external cooling liquid; and
iv. the second coolant is recirculated via the second pump.

2. The process of claim 1, wherein the first coolant and the second coolant are water.

3. The process of claim 1, wherein the first coolant and the second coolant are the same.

4. The process of claim 1, wherein the polymerization reactor is a polypropylene slurry reactor.

5. A process for cooling a polypropylene polymerization reactor having six leg jackets consisting of:
k. pumping a first coolant through a first pair of leg jackets comprising a first leg jacket and a second leg jacket using a first pump;
l. pumping a second coolant through a second pair of leg jackets comprising a third leg jacket and a fourth leg jacket using a second pump; and
m. pumping a third coolant through a third pair of leg jackets comprising a fifthe leg jacket and a sixth leg jacket using a third pump, wherein the first pair of leg jackets, the second pair of leg jackets, and the third pair of leg jackets are different legs from each other, and
wherein the first coolant, the second coolant and the third coolant do not contact each other while inside the leg jackets;
wherein step k. comprises:
i. pumping the first coolant from the first pump into the first leg jacket;
ii. pumping the first coolant from the first leg jacket into the second leg jacket;
iii. pumping the first coolant from the second leg jacket into a first heat exchanger, wherein the first heat exchanger comprises a first external loop conduit circulating a first cold external liquid and the first heat exchanger transfers heat from the first coolant to the first cold external cooling liquid; and
iv. the first coolant is recirculated via the first pump; and
wherein step l. comprises:
i. pumping the second coolant from the second pump into the third leg jacket;
ii. pumping the second coolant from the third leg jacket into the fourth leg jacket;
iii. pumping the second coolant from the fourth leg jacket into a second heat exchanger, wherein the second heat exchanger comprises a second external loop conduit circulating a second cold external liquid and the second heat exchanger transfers heat from the second coolant to the second cold external cooling liquid; and
iv. the second coolant is recirculated via the second pump; and
wherein step m. comprises:
i. pumping the third coolant from the third pump into the fifth leg jacket;
ii. pumping the third coolant from the fifth leg jacket into the sixth leg jacket;
iii. pumping the third coolant from the sixth leg jacket into a third heat exchanger, wherein the third heat exchanger comprises a third external loop conduit circulating a third cold external liquid and the third heat exchanger transfers heat from the third coolant to the third cold external cooling liquid; and
iv. the third coolant is recirculated via the third pump.

6. The process of claim 5, wherein the first coolant, the second coolant, and the third coolant are water.

7. The process of claim 5, wherein the first pump, the second pump, and the third pump are the same pump.

8. The process of claim 5, wherein the first heat exchanger, the second heat exchanger, and the third heat exchanger are the same heat exchanger.

9. The process of claim 5, wherein the first coolant, the second coolant and the third coolant are the same.

10. The process of claim 9, wherein the coolant is water.

11. The process of claim 5, wherein the polymerization reactor is a polypropylene slurry reactor.

12. A process for cooling a polypropylene polymerization reactor having six leg jackets consisting of:
a. pumping a first coolant through a first pair of leg jackets;
b. pumping a second coolant through a set of four leg jackets;
wherein the first pair of leg jackets is different from the set of four leg jackets, and wherein the first coolant and the second coolant do not contact each other while inside the leg jackets.

13. The process of claim 12, wherein the first coolant and the second coolant are water.

14. The process of claim 12, wherein the polymerization reactor is a polypropylene slurry reactor.

15. In a method of cooling a polypropylene polymerization reactor of the type having four leg jackets, wherein a first cooling fluid is pumped in sequence from a first leg jacket to a second leg jacket to a third leg jacket to a fourth leg jacket; a heat exchanger cools the first cooling fluid existing the fourth leg jacket, and the cooling fluid is pumped into the first leg jacket, the improvement consisting of:
a. preventing at least a portion of the first cooling fluid from entering a first pair of leg jackets;
b. introducing a second cooling fluid into the first pair of leg jackets; and
c. withdrawing the first cooling fluid from a second pair of leg jackets, wherein the first cooling fluid and the second cooling fluid do not contact each other while inside the leg jackets; and
d. increasing the flow rate of the first cooling fluid and the second cooling fluid;
e. replacing the pump with a larger pump sufficient to increase the flow rate of the first cooling fluid and the second cooling fluid; and
f. replacing the heat exchanger with a larger heat exchanger sufficient to remove at least the same amount of heat removed by the heat exchanger.

16. The method of claim 15, wherein the first cooling fluid and the second cooling fluid are the same.

* * * * *